United States Patent [19]

Kyber et al.

[11] Patent Number: 5,198,530

[45] Date of Patent: Mar. 30, 1993

[54] PROCESS FOR CONTINUOUS POLYCONDENSATION OF TEREPHTHALIC ACID AND 1,4-BIS(HYDROXYMETHYL)CYCLOHEXANE

[75] Inventors: Manfred Kyber, Maintal; Wolfgang Schmidt, Rodenbach; Ulrich Thiele, Bruchkoebel, all of Fed. Rep. of Germany

[73] Assignee: Zimmer Aktiengesellschaft, Frankfurt, Fed. Rep. of Germany

[21] Appl. No.: 853,974

[22] Filed: Mar. 20, 1992

[30] Foreign Application Priority Data

Nov. 16, 1991 [DE] Fed. Rep. of Germany ....... 4137842

[51] Int. Cl.$^5$ .................. C08G 63/02; C08G 63/78; C08G 63/82
[52] U.S. Cl. .................................. 528/279; 528/272
[58] Field of Search ................................ 528/272, 279

[56] References Cited

U.S. PATENT DOCUMENTS

| | | | |
|---|---|---|---|
| 4,155,889 | 5/1979 | Fagerburg et al. | 528/300 |
| 4,191,705 | 3/1980 | Lindner et al. | 528/176 |
| 4,297,455 | 10/1981 | Lindner et al. | 525/439 |
| 4,350,807 | 9/1982 | McConnell et al. | 528/302 |
| 4,379,912 | 4/1983 | Lu | 528/274 |
| 4,396,746 | 8/1983 | Toga | 525/444 |
| 4,446,303 | 5/1984 | Moore et al. | 528/308.2 |
| 4,481,352 | 11/1984 | McConnell et al. | 528/302 |
| 4,786,692 | 11/1988 | Allen et al. | 525/439 |
| 4,900,610 | 2/1990 | Hochberg et al. | 525/176 |

*Primary Examiner*—John Kight, III
*Assistant Examiner*—T. Mosley
*Attorney, Agent, or Firm*—Allegretti & Witcoff, Ltd.

[57] ABSTRACT

Process for continuous production of polyesters by esterification of terephthalic acid with 1,4-bis(hydroxymethyl)cyclohexane with a split feed in the presence of a titanium catalyst at 265° to 305° C. and 0.8 to 1.5 bar up to a conversion of 98.0% to 99.0%, then performing precondensation at 290° to 305° C. and 0.01 to 1.5 bar up to a conversion of 99.4% to 99.7% and finally performing polycondensation at 295° to 310° C. and less than 1.5 mbar up to a conversion corresponding to 50% to 95% of the maximum possible viscosity after adding more titanium catalyst.

7 Claims, No Drawings

PROCESS FOR CONTINUOUS POLYCONDENSATION OF TEREPHTHALIC ACID AND 1,4-BIS(HYDROXYMETHYL)CYCLOHEXANE

BACKGROUND OF THE INVENTION

This invention relates to a continuous process for preparing (1,4-cyclohexanedimethylene)terephthalate polymers starting from terephthalic acid.

PRIOR ART (1,4-Cyclohexanedimethylene)terephthalate polymers having long been known and are characterized by their high melting points (U.S. Pat. Nos. 2,901,466, 3,261,812, 4,042,570).

Although the use of terephthalic acid as a raw material is not ruled out, only examples starting with dialkyl terephthalates are given in the literature. The high temperatures required to assure the melt phase during polycondensation lead to decomposition products which also act as chain terminators and thus prevent the formation of high-molecular polymers (U.S. Pat. No. 3,271,370). In order to counteract this degradation, there have proposals for using diol and dialkyl terephthalate in approximately equimolar amounts (U.S. Pat. No.3,271,370), using zinc flourotitanate as an especially active catalyst (U.S. Pat. No. 3,068,204), performing the ester exchange step under nitrogen (U.S. Pat. No. 4,042,570) or polymerizing a stabilizing comonomer such as gentisic acid derivatives into the product (German Patent Application 1,495,570).

This tendency to form decomposition products that act as chain terminators occurs to a much greater extent when using terephthalic acid as a raw material, whereby the aforementioned countermeasures have proven to have little or no effect.

In attempts to apply the examples given in the literature for dimethyl terephthalate to terephthalic acid, it has been found that after a polycondensation time of 40 to 60 minutes at 295° to 305° C., the degradation reaction greatly exceeds the condensation reaction and is accompanied by an exponential decline in the intrinsic viscosity plus discoloration of the polymer. Decomposition down the oligomer level has even been observed after lengthy thermal stress. Although it is stated in U.S. Pat. No.3,271,370 that an excess of diol is a disadvantage for the DMT process, this has not been confirmed when using terephthalic acid.

These chain terminating substances are metabolites of 1,4-bis(hydroxymethyl)cyclohexane that are formed by dehydration of the free or esterified $CH_2OH$ groups attached to the cyclohexane ring, thus forming methylenecyclohexane and methylcyclohexene derivatives. This dehydration is catalyzed by acids in general and by terephthalic acid in particular and by the COOH end groups formed by cleavage of ester linkages during the polycondensation process.

THE INVENTION

The object of the present invention is to provide a continuous process that will make it possible to produce stable high-molecular (1,4-cyclohexanedimethylene) terephthalate polymers and copolymers by starting with terephthalic acid. Specifically, the problem includes minimizing the autocatalytic effect of the acid groups of terephthalic acid on the dehydration of the $CH_2OH$ groups attached to the cyclohexane ring.

Both homopolymers and copolymers can be produced by the processing according to this invention. Terephthalic acid of the quality conventionally used for polyesters is used here. The 1,4-bis(hydroxymethyl)cyclohexane should have a cis/trans isomer ratio in the range of 20 to 40 percent cis isomers to 80 to 60 percent trans isomers, preferably 30% cis to 70% trans. Up to 20 mol % terephthalic acid can be replaced by other dicarboxylic acids such as isophthalic acid, cyclohexanedicarboxylic acid or adipic acid. Likewise, 1,4-bis(hydroxymethyl)cyclohexane can be partially replaced by other alkanediols, e.g., ethylene glycol or 1,4-butanediol and/or by polyalkylene oxide diols such as diethylene glycol or low-molecular polybutylene oxide glycol. However, the sum of comonomers in the polyester should not exceed 20 mol %, based on polyester because otherwise the reaction temperatures must be adjusted. Because of the great differences in volatility and reactivity of these diols in some cases, the amount of codiol in the starting monomer mixture must sometimes be much higher than in the resulting polyester. Codiols such as ethylene glycol and diethylene glycol have a much lower boiling point than 1,4-bis(hydroxymethyl)cyclohexane and are expelled preferentially with the reaction vapors, especially from the esterification step. If those skilled in the art do not conventionally know how much comonomer should be used to achieve a certain content in the copolyester, this can be determined easily by preliminary experiments. certain content in the copolyester, this can be determined easily by preliminary experiments.

The autocatalytic degradation reactions according to this invention can be minimized only if the following measures are taken in addition to the usual pressure ranges:

split 1,4-bis(hydroxymethyl)cyclohexane feed with a total molar ratio of diol to diacid at least 1.2 to 1,
split catalyst feed,
narrowly limited temperature ranges in the precondensation and polycondensation steps,
limited, relatively short residence time in the precondensation and polycondensation steps,
termination of melt phase polycondensation before reaching the maximum possible degree of polycondensation, measured as viscosity.

It has thus been found to add only enough diol to the terephthalic acid to yield a paste that is free flowing at 55° to 80° C., which corresponds to a molar ratio of diol to diacid of 1.0–1.5:1, preferably 1.1–1.3:1.

The paste is fed as usual into the esterification mixture that is always present in the esterification reaction in continuous operation.

Additional diol up to a total molar ratio of diol to diacid of 1.2–2.0:1, preferably 1.3–1.8:1, however, is added separately to the sump phase or preferably to the vapor phase of the esterification reactor.

Of the various titanium and tin catalysts tested, organic titanium compounds such as titanium tetraisopropylate and titanium tetra-n-butanoate proven to be especially suitable to accomplish the objectives of this invention. A phosphorus compound may also be added.

Of the total amount of catalyst, only a portion corresponding to 10 to 250 ppm Ti, preferably 40 to 200 ppm Ti, especially 100 to 200 Ti, is introduced as a component of the terephthalic acid-diol paste or as a solution in a small amount of diol into the esterification reaction mixture. Additional catalyst dissolved in a small amount of diol and corresponding to 10 to 300 ppm Ti, preferably 60 to 300 ppm Ti is added to the mixture after precondensation, but it does not matter whether the catalyst is fed into the connecting line to the polycondensation reactor or directly into the reactor. The total amount is preferably 100 to 400 ppm Ti, especially 200 to 400 ppm Ti.

The reaction pressures (p)

$p_a = 0.8–2.0$ bar, preferably 0.9–1.2 bar, (during esterification)

$p_b = 0.01–1.5$ bar, preferably 0.5–1.1 bar, (during precondensation)

$p_c < 1.5$ mbar, preferably $< 0.5$ mbar, (during polycondensation)

are within the conventional ranges for polyalkylene terephthalates, but the temperature program is critical. Deviations from the stipulated temperature ranges $t_a = 265°–305°$ C., preferably $285°–296°$ C., especially $290°–296°$ C., (during esterification)

$t_b = 290°–305°$ C., preferably $294°–298°$ C., (during precondensation)

$t_c = 295°–310°$ C., preferably $300°–305°$ C., (during polycondensation)

where $t_c < t_b$ toward higher temperatures will lead directly to increased decomposition of product, whereas deviations towards lower temperatures will lead to longer residence times and therefore will lead indirectly to increased decomposition. Local temperature fluctuations, so-called hot spots, must be avoided. In particular, the temperature $t_c$ of the polycondensation step must not deviate from the stipulated average temperature by more than 5° C. at any time.

Surprisingly, the extent of the degradation reactions is also determined by the residence time during esterification and precondensation and the respective degrees of polycondensation. The best results are obtained when the esterification step is continued to a relatively high conversion of 98.0 to 99.0% and the residence time in the subsequent precondensation step is relatively short, corresponding to a conversion of 99.4 to 99.7%.

It is even more important to terminate the polycondensation reaction in the melt phase before the maximum degree of polycondensation is reached, particularly at 50% to 95% of the maximum possible viscosity, and preferably at 70% to 95%, or if the product is to undergo solid-phase polycondensation, polycondensation in the melt phase should be terminated at 50–75% of the maximum possible viscosity.

This corresponds to a residence time of 20 to 80 minutes, preferably 30 to 60 minutes, in the polycondensation reactor, including the time until the product enters the downstream granulator. The degree of polycondensation can be determined by measuring the viscosity of the reaction mixture e.g., by torque or capillary viscosimeter.

The degree of polycondensation depends on factors such as the reaction temperatures and pressures, the nature and the quantity of catalysts, the performance of the equipment and the presence of comonomers. Under given conditions, there is a maximum polycondensation threshold beyond which the viscosity can no longer be increased because the degradation reactions exceed the polycondensation reactions.

The changes in viscosity as a function of the residence time in the polycondensation step yield a relatively narrow bell curve with a short induction phase. The maximum viscosity can be determined by preliminary experiments under the same conditions.

Degradation reactions occur essentially from the start of polycondensation. As described initially, the degradation products inhibits molecular build-up and catalyze the degradation process, so the polycondensation reactions decrease steadily while the degradation reactions increase, and these competing reactions are also manifested in subsequent processing from the melt. Therefore, adequate thermal stability of the polyester can be assured only if polycondensation is terminated before the formation of any significant quantities of degradation products, measured as bromine-titratable double bonds and as free COOH groups, i.e., before reaching the maximum viscosity.

The process according to this invention leads to a relatively high-molecular polyester with an intrinsic viscosity of at least 0.60 dL/g that is fully adequate for most applications such as engineering plastics, especially compounds with other polymers and/or fillers. A further increase in intrinsic viscosity can be achieved by solid-phase polycondensation for 4 to 8 hours at a constant or variable temperature in the range of 210° to 280° C. However, a significant increase in viscosity by solid-phase polycondensation is possible only if melt polycondensation is terminated before reaching the maximum possible viscosity that can be achieved in the melt phase.

The polymer obtained by the process according to this invention contains brominetitratable double bonds in an amount of less than 200 meq/kg polyester, preferably less than 100 meq/kg polyester and contains free COOH groups in an amount of less than 40 meq/kg polyester, preferably less than 25 meq/kg.

The individual process steps, esterification, precondensation and polycondensation, are usually carried out in at least three separate interconnected reactors. Two or three reactors connected in series may also be provided for each of the condensation steps. Esterification and precondensation can also be carried out in one reactor, in which case the reactor should consist of two chambers communicating with the same vapor space. Esterification and the feed of raw materials take place in the first chamber and precondensation and discharge of the product take place in the second chamber.

SPECIFIC EXAMPLES

The following examples are presented to support the invention without restricting it in any way. The properties of the polyester were determined by the following methods:

Intrinsic viscosity (I.V.)

Approximately 125 mg polyester are dissolved in 25 mL of a mixture of phenol and 1,2-dichlorobenzene (3:2) and the viscosity of this solution is determined at 25° C. according to Ubbelohde. The intrinsic viscosity is calculated according to Billmeyer from the resulting relative viscosity.

Bromine-titratable double bonds (C=C)

This viscosity corresponds to the maximum possible viscosity.

| | Esterification Step | | | | | | Precondensation Step | | | Polycondensation Step | | | | Polyester | | |
|---|---|---|---|---|---|---|---|---|---|---|---|---|---|---|---|---|
| | Paste CHDM | Addt'l CHDM | Ti | | | | | | | Ti | | | Ended | | COOH | C=C |
| Example No. | mol (1) | mol (1) | ppm (2) | $t_a$ °C. | $p_a$ bar | $d_a$ min | $t_b$ °C. | $p_b$ bar | $d_b$ min | ppm (2) | $t_c$ °C. | $p_c$ mbar | $d_c$ min | At (3) | I.V. dL/g | meq/kg | meq/kg |
| 1 | 1.25 | 0.25 | 160 | 295 | 1.0 | 70 | 295 | 1.0 | 30 | 200 | 300 | 0.1 | 40 | 92% [before] | 0.82 | 18 | 84 |
| 2 | 1.15 | — | 100 | 275 | 1.0 | 45 | 285 | 1.0 | 40 | — | 295 | 0.3 | 50 | 100% | 0.2 | | |
| 3 | 1.15 | — | 100 | 285 | 1.5 | 55 | 290 | 1.0 | 35 | 100 | 295 | 0.3 | 55 | 100% | 0.35 | | |
| 4 | 1.25 | — | 160 | 290 | 1.0 | 60 | 290 | 1.0 | 30 | 50 | 300 | 0.5 | 60 | 100% | 0.56 | 30 | 148 |
| 5 | 1.25 | 0.25 | 160 | 295 | 1.0 | 60 | 298 | 0.75 | 30 | — | 300 | 0.4 | 65 | 100% | 0.44 | | |
| 6 | 1.25 | 0.25 | 160 | 290 | 1.0 | 65 | 295 | 1.0 | 35 | 100 | 300 | 0.3 | 60 | 100% | 0.68 | 25 | 129 |
| 7 | 1.25 | 0.25 | 160 | 295 | 1.0 | 70 | 295 | 1.0 | 30 | 200 | 305 | 0.2 | 35 | 83% [before] | 0.67 | 20 | 80 |
| | | | | | | | | | | | | | 55 | 83% [after] | 0.67 | 50 | 220 |

(1): mol CHDM per 1 mol TPA-feed
(2): ppm Ti based on TPA
(3): polycondensation step ended at the % of maximum possible viscosity [before or after this maximum]

The polyester is reacted with methanol under pressure, the insoluble residue is separated and the C=C bond content in the solution is determined in meq/kg by using known methods with bromine, and a blank value determination is also performed.

Free COOH groups

The polyester is dissolved in a mixture of o-cresol and chloroform (70:30 parts by weight) while heating and the COOH group content is determined photometrically with 0.05N ethanolic potassium hydroxide solution against bromothymol blue.

Examples 1 to 7

600 parts by weight of the esterification product from a preceding experiment were placed in a stirred high-grade steel reactor and heated to the temperature $t_a$. While stirring, about 1000 parts by weight per hour of a hot paste (70° C.) of 1,4-bis(hydroxymethyl)cyclohexane (CHDM) with a cis/trans ratio of 30/70 and terephthalic acid (TPA) plus titanium tetra-n-butanoate were fed into the esterification product. At the same time, liquid 1,4-bis(hydroxymethyl)cyclohexane was fed into the vapor space above the esterification product. After an average residence time $d_a$ at the temperature $t_a$, esterification product was pumped continuously into a precondensation reactor where it was precondensed at the pressure $p_b$ and the temperature $t_b$ until reaching a conversion of about 99.5%, corresponding to an average residence time of $d_b$.

The precondensation product was pumped continuously into a ring disk reactor such as that described in U.S. Pat. No. 3,617,225 while titanium tetra-n-butanoate dissolved in a small amount of CHDM was fed into the reactor at the same time. After an average residence time of $d_c$ at the temperature $t_c$ and the pressure $p_c$, the product was fed continuously into a granulator.

The process parameters and the characteristics of the resulting polyester are summarized in the following table. The temperatures $t_c$ given there did not differ by more than 5° C. from the set point value at any point in the reactor.

The maximum possible viscosity was determined by preliminary runs under identical conditions, but with longer residence time $d_c$ until the continuously recorded viscosity after a period of increase began to decrease. This viscosity corresponds to the maximum possible viscosity.

As shown by the preceding table, an intrinsic viscosity of the polyester of at least 0.60 dL/g can be achieved only if all parameters according to this invention are maintained at the same time. Thus in Examples 2 to 5 which are given for comparison purposes and where the additional CHDM feed and/or the second addition of titanium catalyst was omitted, no mentionable increase in viscosity could be achieved in the polycondensation step.

When the polycondensation step was continued after reaching the maximum possible viscosity, the number of free COOH groups and bromine-titratable double bonds increased rapidly and the viscosity declined, as shown by Example 7.

Example 8

Example 1 was repeated, using a mixture of terephthalic acid and 9 wt % isophthalic acid instead of all terephthalic acid. The resulting polyester had the following characteristics:

| | |
|---|---|
| Intrinsic viscosity | 0.81 dL/g |
| Bromine-titratable double bonds | 90 meq/kg |
| Free COOH groups | 25 meq/kg |

Example 9

Example I was repeated, but 30 mol % of the 1,4-bis(hydroxymethyl)cyclohexane was replaced by diethylene glycol. The resulting copolyester contained 4.7 wt % diethylene glycol, corresponding to 12.75 mol %, based on the polyester, and had the following characteristics:

| | |
|---|---|
| Intrinsic viscosity (corresponding to 88% of the maximum possible viscosity) | 0.742 dL/g |
| Bromine-titratable double bonds | 68 meq/kg |
| Free COOH groups | 15 meq/kg |

Example 10

Example 1 was repeated but the polycondensation was terminated in the melt at an I.V. of 0.56 dL/g, corresponding to about 65% of the maximum possible viscosity (0.86 dL/g) and the granules were subjected to solid-phase condensation at a temperature of 260° C. for 5 hours in a stream of nitrogen. The resulting polyester had the following characteristics:

| Intrinsic viscosity | 0.93 dL/g |
|---|---|
| Bromine-titratable double bonds | 90 meq/kg |
| Free COOH groups | 21 meq/kg |

Example 11

Example 1 was repeated, but the melt condensation was continued up to the maximum viscosity. The resulting polyester with an I.V. of 0.85 dL/g was subjected to solid-phase condensation as in Example 10. The polyester then had the following characteristics:

| Intrinsic viscosity | 0.82 dL/g |
|---|---|
| Bromine-titratable double bonds | 250 meq/kg |
| Free COOH groups | 58 meq/kg |

Evidently, the viscosity cannot be increased by solid-phase polycondensation if the melt-phase polycondensation has been continued up to the maximum possible viscosity in the melt phase. When melt-phase polycondensation is terminated prematurely, the viscosity can be increased by solid-phase polycondensation beyond the maximum that could be achieved in the melt phase, as shown in Example 10.

We claim:

1. In a process for continuous production of polyesters having at least 80 mol % (1,4-cyclohexanedimethylene) terephthalate units, an intrinsic viscosity of at least 0.60 dL/g, less than 200 meq/kg bromine-titratable double bonds and less than 40 meq/kg free COOH groups, comprising:
    a) feeding continuously into an esterification reactor a free flowing paste, at a temperature of 55°-80° C. of 1,4-bis(hydroxymethyl)cyclohexane (diol) and terephthalic acid (diacid), the molar ratio of diol: diacid being 1.0-1.5:1, said diol having a cis/trans isomer ratio of 20-40:80-60,
    b) simultaneously feeding 1,4-bis(hydroxymethyl)cyclohexane heated to 50°-80° C. into said esterification reactor so that the total molar ratio of diol to acid is 1.2-2.0:1,
    c) esterifying the mixture continuously to a conversion of 98.0 to 99.0% in the presence of 10 to 250 ppm Ti based on the diacid, at a temperature $t_a$ in the range of 265°-305° C. and a pressure $p_a$ in the range of 0.8-2.0 bar and a residence time $d_a$ of 20-100 min. said Ti being in the form of an organic compound,
    d) precondensing continuously the esterification mixture to a conversion of 99.4 to 99.7% at a temperature $t_b$ in the range of 290°-305° C., a pressure $p_b$ of 0.01 to 1.5 bar and a residence time $d_b$ of 10-70 minutes,
    e) polycondensing said precondensed mixture by adding to said precondensed mixture an additional 60-300 ppm of said Ti based on the diacid at a temperature $t_c \geq t_b$ in the range of 295°-310° C. in the absence of local temperature fluctuations of more than 5° C., a pressure $p_c$ less than 1.5 mbar and a residence time $d_c$ of 20-80 minutes sufficient to achieve a conversion corresponding to 50-95% of the maximum possible viscosity.

2. Process according to claim 1 wherein
    in step a) the paste has a molar ratio of diol to diacid of 1.1-1.3:1,
    in step b) the molar ratio of diol to diacid is 1.3-1.8:1,
    in step c) the amount of Ti is 40-200 ppm, the temperature $t_a$ is 285°-296° C., the pressure $p_a$ is 0.9-1.2 bar, and the residence time is 30-60 minutes,
    in step d) the temperature $t_b$ is 294°-298° C., the pressure $p_b$ is 0.5-1.1 bar, and the residence time is 20-50 minutes,
    in step e) the temperature $t_c$ is 300°-305° C., the pressure is <0.5 mbar and the residence time is 30-60 minutes, and
    in steps c) and e) the total amount of Ti is 100-400 ppm.

3. Process according to claim 1 wherein in step e) the conversion is 70-90% of the maximum possible viscosity.

4. Process according to claim 1 wherein the polycondensation product of step e) is subjected to solid-phase polycondensation for 4-8 hours at a constant or variable temperature in the range of 210°-280° C.

5. Process according to claim 4 wherein the conversion is 50-75% of the maximum possible viscosity.

6. Process according to claim 1 in which said diacid is a mixture of terephthalic and 0-20 mole % isophthalic acid based on the sum of the diacids.

7. Process of claim 1 in which said diol is a mixture of 1,4-bis(hydroxymethyl)cyclohexane and 0-30 mole % diethylene glycol based on the sum of the diols.

* * * * *